(12) United States Patent
Jeon et al.

(10) Patent No.: US 6,855,955 B2
(45) Date of Patent: Feb. 15, 2005

(54) THIN FILM TRANSISTOR ARRAY PANEL

(75) Inventors: Jin Jeon, Anyang (KR); Won-Kyu Lee, Sungnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/454,788

(22) Filed: Jun. 4, 2003

(65) Prior Publication Data
US 2003/0234399 A1 Dec. 25, 2003

(30) Foreign Application Priority Data
Jun. 4, 2002 (KR) ................................ 10-2002-0031298

(51) Int. Cl.⁷ ...................... H01L 29/04; H01L 31/036; G02F 1/136
(52) U.S. Cl. ............................. 257/59; 257/72; 349/42
(58) Field of Search ........................ 257/59, 72; 349/42

(56) References Cited

U.S. PATENT DOCUMENTS

| | | | | |
|---|---|---|---|---|
| 5,042,916 A | * | 8/1991 | Ukai et al. | 349/55 |
| 5,929,489 A | * | 7/1999 | Deane | 257/347 |
| 6,326,641 B1 | * | 12/2001 | Choi | 257/57 |
| 6,341,002 B1 | * | 1/2002 | Shimizu et al. | 349/119 |
| 6,590,226 B2 | * | 7/2003 | Kong et al. | 257/59 |
| 6,714,267 B2 | * | 3/2004 | Choi et al. | 349/43 |
| 2002/0130324 A1 | * | 9/2002 | Song et al. | 257/72 |

* cited by examiner

Primary Examiner—Howard Weiss
(74) Attorney, Agent, or Firm—F. Chau & Associates, LLC

(57) ABSTRACT

A gate wire including a plurality of gate lines, a plurality of gate pads 125 connected to one ends of the gate lines, and a plurality of gate electrodes 123 connected to the gate lines, and a storage wire for receiving a common voltage are formed on the substrate. A semiconductor layer and an ohmic contact layer are formed on the gate insulating layer covering the gate wire and the storage wire. A data wire including a plurality of data lines defining a plurality of pixel areas along with the gate lines, a plurality of source electrodes extending onto the semiconductor layer, and a plurality of drain electrodes separated from the source electrodes and opposite the source electrodes with respect to the gate lines is formed thereon. A plurality of storage capacitor conductors overlapping the storage wire to form storage capacitance are formed on the gate insulating layer. The storage capacitor conductors include a plurality of repairing portions extended therefrom and overlapping the gate lines. A passivation layer is formed on the data wire and portions of the semiconductor layer which are not covered with the data wire, and a plurality of pixel electrodes connected to the drain electrodes and the storage capacitor conductors through a plurality of contact holes provide at the passivation layer are formed on the passivation layer.

18 Claims, 5 Drawing Sheets

THIN FILM TRANSISTOR ARRAY PANEL

BACKGROUND OF THE INVENTION (a) Field of the Invention

The present invention relates to a thin film transistor array panel.

(b) Description of the Related Art

Generally, a liquid crystal display (LCD) includes two panels provided with electrodes and a liquid crystal layer interposed therebetween and controls light transmittance by adjusting the magnitude of the voltages applied to the electrodes.

The LCD includes a plurality of pixels for displaying images. The pixels are arranged in a matrix and each pixel includes a pixel electrode made of a transparent conductive material. The pixel electrodes are driven by signals from a plurality of signal lines including a plurality of gate lines and a plurality of data lines. The gate lines and the data lines intersect each other to define a plurality of pixel area arranged in a matrix and connected to the pixel electrodes through a plurality of switching elements such as thin film transistors (TFTs). The switching elements selectively transmit image signals from the data lines in response to the scanning signals from the gate lines. Each pixel further includes a storage electrode forming a storage capacitor along with the pixel electrode for maintaining the image signal applied to the pixel electrode until the next signal is applied thereto.

A pixel defect generated in a manufacturing process of an LCD having TFTs is one of the factors increasing the product cost. Since a white defect of the pixel defect that a pixel is always bright is easily recognized, it is preferable that the white defect is repaired to be converted into an indistinguishable black defect that a pixel is always dark.

A kind of origins of the white defect is the poor contact between a pixel electrode and a switching element or the malfunction of the switching element. In this case, although the defected pixel initially displays a black state, it is gradually changed into a white defect as time goes due to the current leakage of the pixel electrode, which makes the voltage of the pixel electrode reach a common voltage of a common electrode facing the pixel electrode. Alternatively, the white pixel is resulted from the short circuit between a data line and a pixel electrode via a conductor remnant or from the short circuit between a common electrode and a pixel electrode.

One of conventional repairing methods for converting a white defect into a black defect short-circuits a pixel electrode with a gate line overlapping the pixel electrode to form a storage capacitor and transmitting a gate signal to a switching element of pixels in an adjacent row such that the pixel electrode is supplied with the gate signal from the gate line.

However, a thick insulating layer with thickness of two to four microns interposed between the pixel electrode and the gate line obstructs the laser short circuit therebetween. Furthermore, the white defect of an independent wire type LCD having storage electrodes overlapping pixel electrodes may not be repaired by short-circuiting a defected pixel electrode and a storage electrode overlapping the pixel electrode since the storage electrode is supplied with a common voltage.

SUMMARY OF THE INVENTION

The present invention provides a TFT array panel having a pixel structure capable of easily repairing a white pixel defect of an independent type LCD having a separate storage wire.

A TFT array panel for an LCD according to the present invention includes a conductor pattern connected to a pixel electrode electrically connected to a pixel electrode.

According to one embodiment of the present invention, a thin film transistor array panel includes a gate wire for transmitting a gate signal formed on a substrate and including a gate line, and a gate electrode connected to the gate line, and a storage wire for receiving a common voltage separated from the gate line and formed on the substrate. A semiconductor layer and a data wire including a data line intersecting the gate line to define a pixel area, a source electrode connected to the data line and located on the semiconductor layer, and a drain electrode opposite the source electrode with respect to the gate line and located on the semiconductor layer are formed on the gate insulating layer covering the gate wire and the storage wire. A conductor pattern overlapping the storage wire to form storage capacitance is formed on the gate insulating layer, and a passivation layer is formed thereon. A pixel electrode connected to the drain electrode or the conductor pattern is formed on the passivation layer. One of the gate line and the conductor pattern includes a repairing extension overlapping the other of the gate line and the conductor pattern.

The conductor pattern is connected to or separated from the drain electrode.

The pixel electrode may include at least one of a transparent conductive film and a reflective conductive film. When the pixel electrode includes the transparent conductive film and the reflective conductive film, the reflective conductive film preferably has an opening exposing the transparent conductive film.

The repairing extension may have a ring shape, and the semiconductor layer may have substantially the same shape as the data wire except for a channel area between the source electrode and the drain electrode.

DETAILED DESCRIPTION OF PREFERRED EMBODIMENTS

Figure 1:
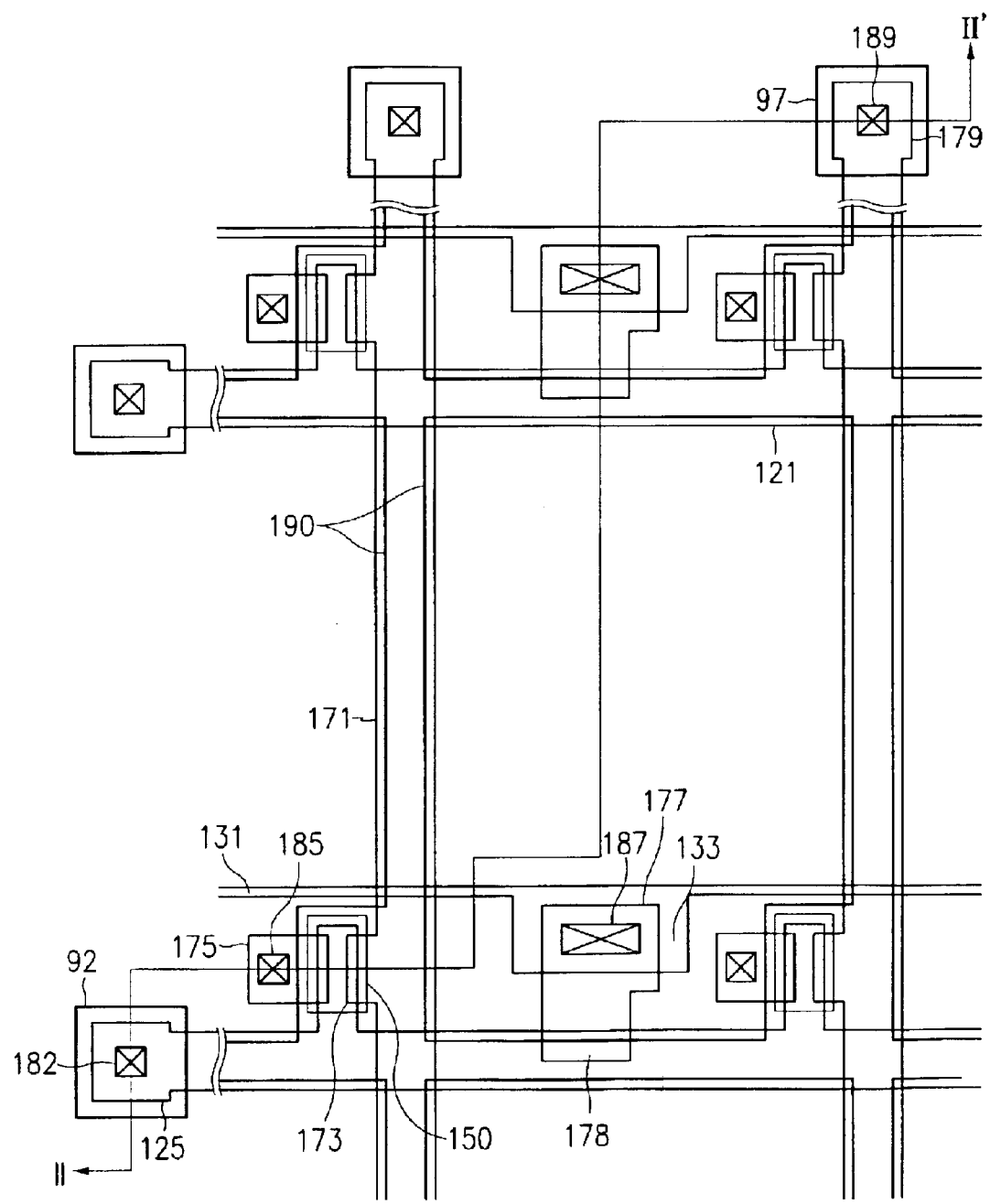
FIG. 1 is a layout view of a TFT array panel for an LCD according to a first embodiment of the present invention.

The present invention now will be described more fully hereinafter with reference to the accompanying drawings, in which preferred embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

A TFT array panel for an LCD according to a first embodiment of the present invention is described in detail with reference to FIGS. 1 and 2.

Figure 2:
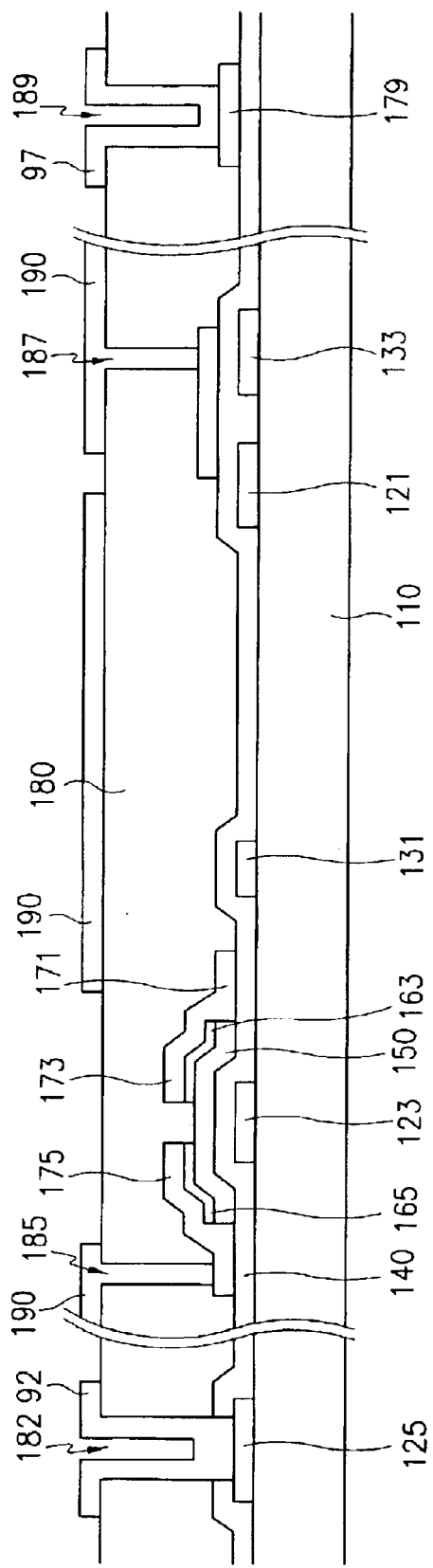
FIG. 2 is a sectional view of the TFT array panel shown in FIG. 1 taken along the line II–II'.

FIG. 1 is a layout view of a TFT array panel for an LCD according to a first embodiment of the present invention, and FIG. 2 is a sectional view of the TFT array panel shown in FIG. 1 taken along the line II—II.

A gate wire and a storage wire are formed on an insulating substrate 110. The gate wire and the storage wire include a single layer preferably made of a conductive material such as Al having low resistivity or multiple layers including the single layer.

The gate wire includes a plurality of gate lines 121 extending substantially in a transverse direction, a plurality of gate pads 125 connected to one ends of the gate lines 121 to transmit gate signals from an external device to the gate lines 121, and a plurality of gate electrodes 123 of TFTs connected to the gate lines 121.

The storage wire includes a plurality of storage lines 131 and a plurality of storage electrodes 133. The storage lines 131 extend substantially in the transverse direction. The storage electrodes 133 overlap storage capacitor conductors 177 connected to pixel electrodes 190 to form storage capacitors for enhancing the charge storing capacity of the pixels, which is described later. A voltage applied to a common electrode (not shown) on an upper panel (not shown) facing the substrate 110 is applied to the storage wire 131 and 133.

When the gate wire 121, 123 and 125 includes multiple layers, it includes a pad material having good contact characteristic with other material.

The storage wire 131 and 133 may be supplied with the gate signals.

A gate insulating layer 110 preferably made of SiNx on the substrate 110 is formed on the gate wire 121,123 and 125.

A semiconductor layer 150 preferably made of amorphous silicon is formed on the gate insulating layer 140 opposite the gate electrodes 123. An ohmic contact layer 163 and 165 preferably made of silicide or n+ hydrogenated amorphous silicon heavily doped with n type impurities is formed on the semiconductor layer 150.

A data wire 171, 173, 175 and 179 is formed on the ohmic contact layer 163 and 165 and the gate insulating layer 140. The data wire 171, 173, 175 and 179 includes a single layer having low resistivity such as Ag, Al alloy, Al and Al alloy, or multiple layers including the single layer.

The data wire 171, 173, 175 and 179 includes a plurality of data lines 171, a plurality of source electrodes 173, a plurality of data pads 179, a plurality of drain electrodes 175, and a plurality of storage capacitor conductors 177. The data lines 171 extend in a longitudinal direction and intersect the gate lines 121 to form a plurality of pixel areas arranged in a matrix. The source electrodes 173 are connected to the data lines 171 and extend onto one portions 163 of the ohmic contact layer. The drain electrodes 175 are located on the other portions 165 of the ohmic contact layer, located opposite the source electrodes 173 with respect to the gate electrodes 123, and separated from the source electrodes 173. The data pads 179 are connected to one ends of the data lines 171 to receive image signals from an external device. The storage capacitor conductors 177 overlap the storage electrodes 133 to form storage capacitors for enhancing the storing capacity and include repairing portions 178 overlapping the gate lines 121.

A passivation layer 180 is formed on the data wire 171, 173, 175, 177 and 179 and portions of the semiconductor layer 150 which are not covered with the data wire 171, 173, 175, 177 and 179. The passivation layer 180 preferably includes SiNx or an organic insulating material having good planarization characteristic.

The passivation layer 180 is provided with a plurality of contact holes 185, 187 and 189 respectively exposing the drain electrodes 175, the storage capacitor conductors 177 and the data pads 179. The passivation layer 180 and the gate insulating layer 140 have a plurality of contact holes 182 exposing the gate pads 125.

A plurality of pixel electrodes 190 are formed in the pixel areas on the passivation layer 180. The pixel electrodes 190 are electrically connected to the drain electrodes 175 and the storage capacitor conductors 177 through the contact holes 185 and 187, respectively. Furthermore, a plurality of subsidiary gate pads 92 and a plurality of subsidiary data pads 97 are formed on the passivation layer 180. The pixel electrodes 190, the subsidiary gate pads 92 and the subsidiary data pads 97 are preferably formed of a transparent conductive material such as indium tin oxide ("ITO") or indium zinc oxide ("IZO"). Alternatively, the pixel electrodes 190 includes a reflecting layer having reflectance such as Ag, Ag alloy, Al and Al alloy, and the passivation layer 180 has embossment on its surface, which gives roughness to the reflecting layer for enhancing the reflection.

The repairing portion 178 enables to easily convert a white pixel defect, which makes a pixel twinkle constantly and is caused by floating of a pixel electrode 190 or application of the common voltage to a pixel electrode 190, into a black pixel defect which is hardly caught. That is, although it is hard to laser short-circuiting the defected pixel electrode 190 and the gate line 121 overlapping the pixel electrode 190 for repairing the white defect due to the thick insulating layer 180 with thickness of about two to four microns interposed therebetween, the defected pixel electrode 190 can be supplied with a gate-off voltage for most time by laser short-circuiting the repairing portion 178 connected to the pixel electrode 190 and the gate line 121 overlapping the repairing portion 178. Then, the pixel including the defected pixel electrode 190 of a normally white mode LCD, which displays a white image in absence of potential difference between the pixel electrodes 190 and the common electrode, becomes dark since the pixel electrode 190 supplied with the gate-off voltage has a potential difference from the common electrode to generate an electric field.

Although the overlapping of the storage capacitor conductor 177 and the gate line 121 is made by the repairing portion 178 extended from the storage capacitor conductor 177 in this embodiment, it can be made by an extension of the gate line 121 or extensions of both the gate line 121 and the storage capacitor conductors 177. The repairing portion 178 may have various shapes such as a ring having an opening in its center.

According to another embodiment of the present invention, the storage wire include a pair of storage lines located at upper and lower portions of the pixel areas and a plurality of pixel electrodes extending in the longitudinal direction and located near an edge of the pixel areas.

As described above, although the first embodiment of the present invention provides a repairing member connected to a pixel electrode, a second embodiment of the present invention provides a repairing member extended from a gate line, which will be described in detail with reference to FIGS. 3–5.

Figure 3:
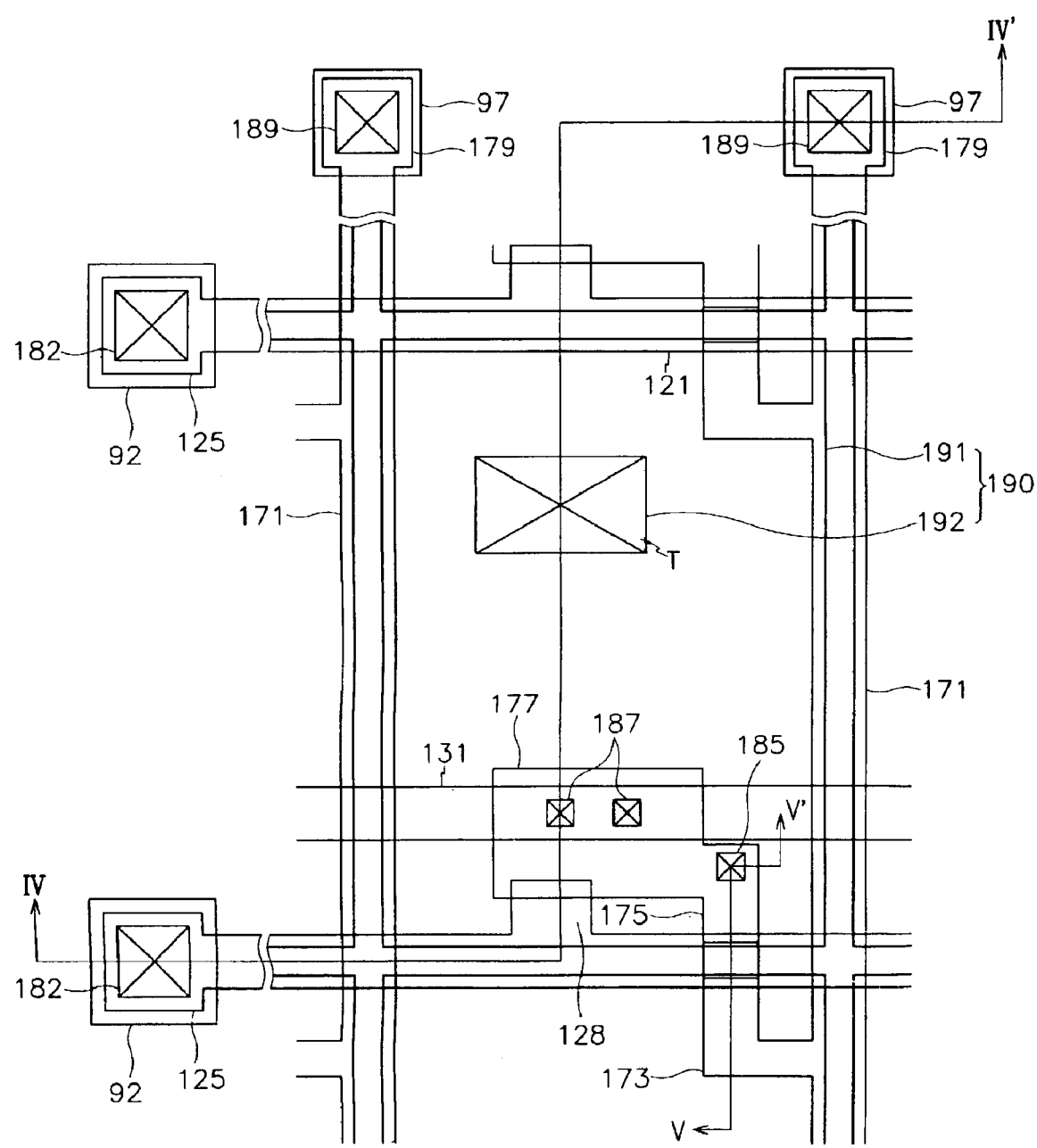
FIG. 3 is a layout view of a TFT array panel for an LCD according to a second embodiment of the present invention.
Figure 4:
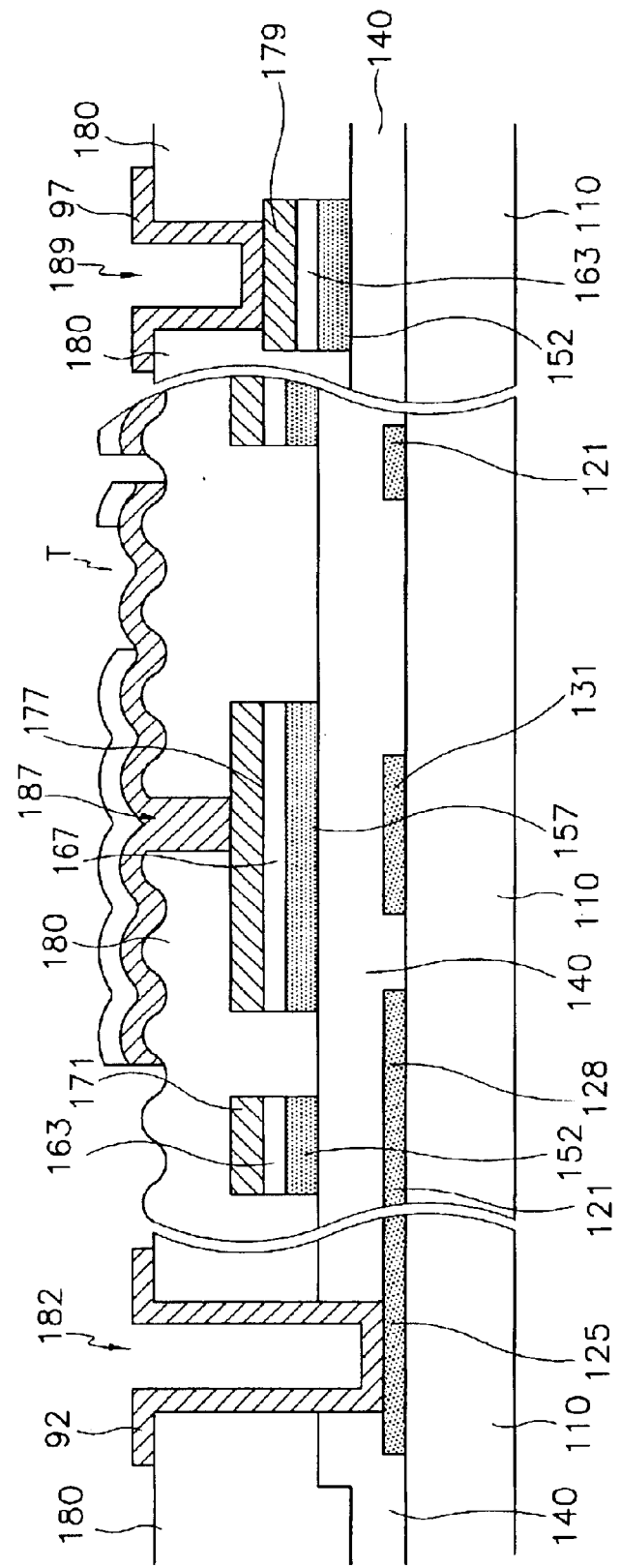
FIGS. 4 and 5 are sectional views of the TFT array panel shown in FIG. 3 taken along the lines IV–IV' and V–V', respectively.
Figure 5:
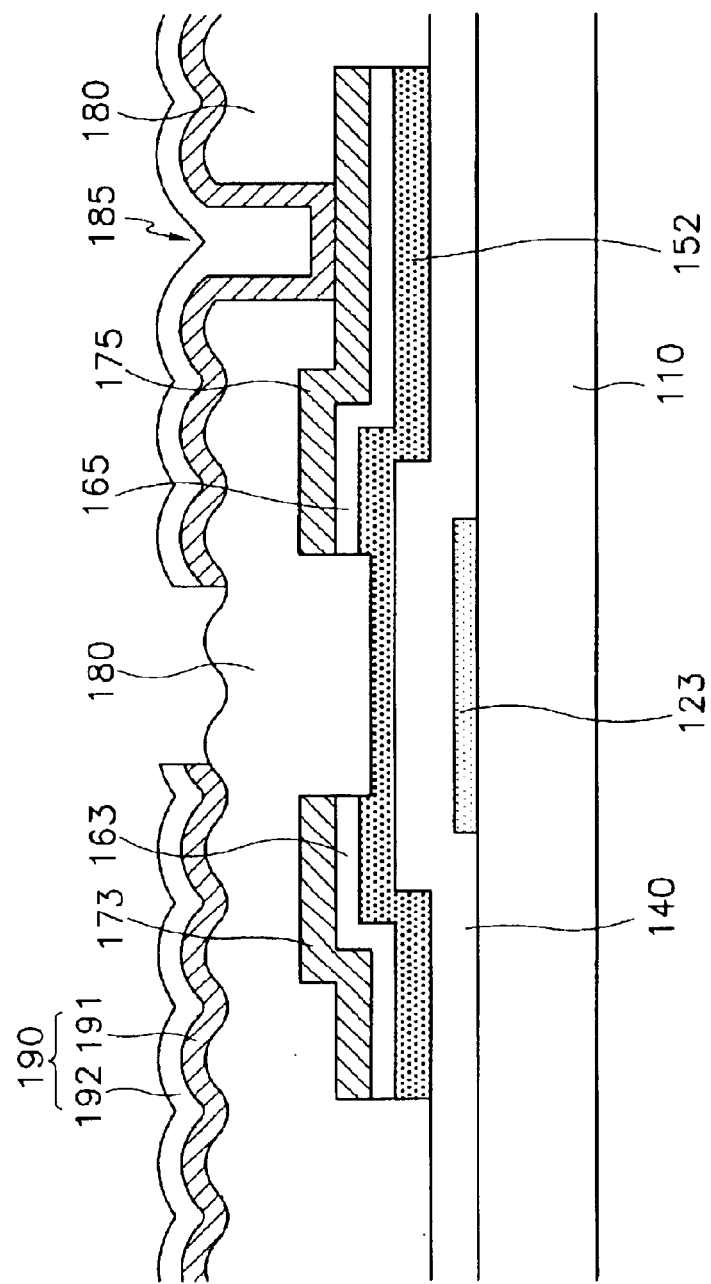

FIG. 3 is a layout view of a TFT array panel for an LCD according to a second embodiment of the present invention, and FIGS. 4 and 5 are sectional views of the TFT array panel shown in FIG. 3 taken along the lines IV–IV' and V–V', respectively.

The TFT array panel has a structure similar to that of the first embodiment.

However, a gate wire includes a plurality of repairing portions 128 extended from a plurality of gate lines 121 and overlapping a plurality of storage capacitor conductors 177 via a gate insulating layer 140.

A semiconductor pattern 152 and 157 preferably made of hydrogenated amorphous silicon are formed on the gate insulating layer 140 covering the gate wire 121, 123, 125 and 128. An ohmic contact pattern (or an intermediate layer pattern) 163, 165 and 167 preferably made of amorphous silicon heavily doped with n type impurities such as phosphorous P are formed on the semiconductor pattern 152 and 157.

The ohmic contact pattern 163, 165 and 167 reduces the contact resistance between the underlying semiconductor pattern 152 and 157 and an overlying data wire 171, 173, 175, 177 and 179 and has substantially the same shape as the data wire 171, 173, 175, 177 and 179. That is, the ohmic contact pattern 163, 165 and 167 includes a plurality of data-line ohmic contacts 163 having substantially the same shapes as data line units 171, 179 and 173, a plurality of drain-electrode ohmic contacts 165 having substantially the same shapes as drain electrodes 175, and a plurality of storage-capacitor ohmic contacts 167 having substantially the same shapes as the storage capacitor conductors 177.

Meanwhile, the semiconductor pattern 152 and 157 has substantially the same shape as the data wire 171, 173, 175, 177 and 179 and the ohmic contact pattern 163, 165 and 167 except for the TFT channel areas C. Specifically, the semiconductor pattern 152 and 157 includes a plurality of storage-capacitor semiconductors 157 having substantially the same shapes as the storage capacitor conductors 177 and the storage-capacitor ohmic contacts 167 and a plurality of TFT semiconductors 152 which have slightly different shapes from the remains of the data wire and the ohmic contact pattern. That is, the source and the drain electrodes 173 and 175 are separated from each other at the TFT channel areas C, where the data-line ohmic contacts 163 and the drain-electrode ohmic contacts 165 are also separated from each other. However, the TFT semiconductors 152 continue to proceed there without disconnection to form TFT channels.

The storage capacitor conductors 177, which are connected to a plurality of pixel electrodes 190 and overlap a plurality of storage lines 131 to form storage capacitors, are connected to the drain electrodes 175.

A passivation layer 180 has embossment on its surface, and each pixel electrode 190 on the passivation layer 180 includes a transparent electrode 191 and a reflecting electrode 192 having a transmission window T. The transparent electrode 191 is made of a transparent conductive material such as IZO and ITO, while the reflecting electrode 192 is made of a reflective conductive material such as Al, Al alloy, Ag and Ag alloy.

The repairing portion 128 according to the second embodiment of the present invention may also have a ring shape.

Methods of manufacturing the TFT array panels for an LCD according to the first and the second embodiments of the present invention will be now briefly described with reference to FIGS. 1–5.

First, a single layer with low resistivity such as Ag, Ag alloy, Al and Al alloy or multiple layers including the above-described single layer is deposited on a substrate 110, and patterned by photo-etching with a mask to form a gate wire 121, 123 and 125 and a storage wire 131 and 133.

Next, triple layers including a gate insulating layer 140 preferably made of silicon nitride, a semiconductor layer preferably made of amorphous silicon, and a doped amorphous silicon layer are sequentially deposited. The doped amorphous silicon layer and the semiconductor layer are patterned with a mask to form an ohmic contact layer and a semiconductor layer 150 of the same shapes on the gate insulating layer 140 opposite the gate electrodes 123.

Thereafter, a data conductive layer is deposited and patterned by photo-etching with a mask to form a data wire 171, 173, 175, 177, 178 and 179. If there is a sufficient storage capacitance, the storage capacitor conductors 177 may be omitted.

Then, portions of the ohmic contact layer, which are not covered by the data wire 171, 173, 175, 177 and 179, are removed such that the ohmic contact layer is divided into a plurality of pairs of two separated portions 163 and 165 with respect to the gate electrodes 123 and portions of the semiconductor layer 150 between the separated portions 163 and 165 of the ohmic contact layer are exposed. In order to stabilize the exposed surface of the semiconductor layer 150, oxygen plasma treatment is preferably performed.

A passivation layer 180 is formed by deposition of silicon nitride or an organic insulating material having low dielectric constant and good planarization characteristic on the substrate 110. The passivation layer 180 together with the gate insulating layer 140 is patterned by photo-etching to form a plurality of contact holes 182, 185, 187 and 189 exposing the gate pads 125, the drain electrodes 175, the storage capacitor conductors 177 and the data pads 179. If there is no storage capacitor electrode, the contact holes 187 need not be formed.

Finally, an ITO layer or an IZO layer is deposited and patterned with a mask to form a plurality of pixel electrodes 190, a plurality of subsidiary gate pads 92 and a plurality of subsidiary data pads 97. The pixel electrodes 190 are connected to the drain electrodes 175 through the contact holes 182 and to the storage capacitor conductors 177 through the contact holes 187. The subsidiary gate pads 92 and the subsidiary data pads 95 are connected to the gate pads 125 and the data pads 179 through the contact holes 182 and 189, respectively.

In the meantime, the method of manufacturing a TFT array panel for an LCD according to the second embodiment uses a single photoresist pattern for a photo-etching for forming a semiconductor pattern 152 and 157, an ohmic contact pattern 163, 165 and 167, and the data wire 171, 173, 175, 177 and 179.

In detail, after a gate wire is formed, a gate insulating layer 140, a semiconductor layer preferably made of amorphous silicon, and a doped amorphous silicon layer are sequentially deposited.

A data conductive layer is formed thereon, and a photoresist film is coated on the data conductive layer. Thereafter, the photoresist pattern having position-dependent thickness is formed by using a mask having an adjusting layer for adjusting light transmittance of channel areas C. The photoresist pattern has first portions on the data wire and second portions on the channel areas, and the second portions have thickness smaller than the first portions. The remaining areas have no photoresist.

The semiconductor pattern 152 and 157 is first formed by using the photoresist pattern an etch mask. After removing the second portions of the photoresist pattern, the data wire 171, 173, 175, 177 and 179 is formed by removing portions of the data conductive layer in the channel areas C using the first portions of the photoresist pattern as an etch mask. The ohmic contact pattern 163, 165 and 167 is formed by etching the doped amorphous silicon layer using overlying layer or film as an etch mask.

A plurality of pixel electrodes 190 is formed by sequentially forming a plurality of transparent electrodes 191 and a plurality of reflecting electrodes 192. The transparent electrodes 191 are formed by depositing a transparent conductive material on a passivation layer 180 having embossment and patterning the deposited material using photo-etching with a mask. The reflecting electrodes 192 are formed by depositing a reflective conductive material on the transparent electrodes 191 and patterning the deposited material.

Consequently, the present invention easily repairs a white pixel defect of a TFT array panel for an LCD having a thick organic insulating layer interposed between pixel electrodes and gate lines, by providing repairing portions overlapping the gate lines for conductors electrically connected to the pixel electrodes or by providing repairing portions overlapping conductors electrically connected to the pixel electrodes for the gate lines.

What is claimed is:

1. A thin film transistor array panel comprising:
   a substrate;
   a gate wire that transmits a gate signal formed on the substrate and including a gate line, and a gate electrode connected to the gate line;
   a storage wire formed on the substrate and separated from the gate line;
   a gate insulating layer formed on the substrate and covering the gate wire and the storage wire;
   a semiconductor layer formed on the gate insulating layer opposite the gate electrode;
   a data wire formed on the gate insulating layer including a data line intersecting the gate line to define a pixel area, a source electrode connected to the data line and located on the semiconductor layer, and a drain electrode opposite the source electrode with respect to the gate line and located on the semiconductor layer;
   a conductor pattern formed on the gate insulating layer and overlapping the storage wire to form storage capacitance;
   a passivation layer covering the data wire and the semiconductor layer; and
   a pixel electrode formed substantially in the pixel area on the passivation layer and connected to the drain electrode or the conductor pattern,
   wherein the gate line or the conductor pattern includes a repairing extension overlapping the conductor pattern or the gate line.

2. The thin film transistor array panel of claim 1, wherein the repairing extension is extended from the conductor pattern.

3. The thin film transistor array panel of claim 2, wherein the storage wire is applied with a common voltage.

4. The thin film transistor array panel of claim 3, wherein the repairing extension has a ring shape.

5. The thin film transistor array panel of claim 1, wherein the repairing extension is extended from the gate line.

6. The thin film transistor array panel of claim 5, wherein the repairing extension has a ring shape.

7. The thin film transistor array panel of claim 1, wherein the semiconductor layer has substantially the same shape as the data wire except for a channel area between the source electrode and the drain electrode.

8. The thin film transistor array panel of claim 1, wherein the pixel electrode comprises a transparent conductive film and a reflective conductive film having an opening exposing the transparent conductive film.

9. A thin film transistor array panel comprising:
   a substrate;
   a gate wire that transmits a gate signal formed on the substrate;
   a storage wire formed on the substrate and separated from the gate wire;
   a thin film transistor formed on the substrate, the thin film transistor including a gate electrode, a drain electrode and a source electrode, the gate electrode being connected to the gate wire;
   a conductor pattern formed above the storage wire to form a storage capacitance; and
   a transparent pixel electrode formed in the pixel area and connected to the thin film transistor or the conductor pattern,
   wherein the gate wire or the conductor pattern includes a repairing extension overlapping the conductor pattern or the gate wire.

10. The thin film transistor array panel of claim 9, wherein the repairing extension is extended from the conductor pattern.

11. The thin film transistor array panel of claim 10, wherein the conductor pattern is connected to the thin film transistor.

12. The thin film transistor array panel of claim 10, wherein the conductor pattern is separated from the thin film transistor.

13. The thin film transistor array panel of claim 9, wherein the repairing extension is extended from the gate wire.

14. A thin film transistor array panel comprising:
   a substrate;
   a gate wire that transmits a gate signal formed on the substrate;
   a storage wire formed on the substrate and separated from the gate wire;
   a thin film transistor formed on the substrate, the thin film transistor including a gate electrode, a drain electrode and a source electrode, the gate electrode being connected to the gate wire;
   a conductor pattern formed above the storage wire to form a storage capacitance; and
   a pixel electrode having a transparent pixel region and a reflective pixel region, formed in the pixel area and connected to the thin film transistor or the conductor pattern,
   wherein the gate wire or the conductor pattern includes a repairing extension overlapping the conductor pattern or the gate wire.

15. The thin film transistor array panel of claim 14, wherein the repairing extension is extended from the conductor pattern.

16. The thin film transistor array panel of claim 15, wherein the conductor pattern is connected to the thin film transistor.

17. The thin film transistor array panel of claim 14, wherein the repairing extension is extended from the gate wire.

18. The thin film transistor array panel of claim 17, wherein the conductor pattern is separated from the thin film transistor.

* * * * *